(12) United States Patent
Nicastri

(10) Patent No.: US 9,224,298 B2
(45) Date of Patent: Dec. 29, 2015

(54) SYSTEM AND METHOD FOR COMMUNICATING AN OBJECT ATTACHED TO A VEHICLE

(71) Applicant: FORD GLOBAL TECHNOLOGIES, LLC, Dearborn, MI (US)

(72) Inventor: Paul R. Nicastri, Howell, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 52 days.

(21) Appl. No.: 14/061,010

(22) Filed: Oct. 23, 2013

(65) Prior Publication Data

US 2015/0109117 A1 Apr. 23, 2015

(51) Int. Cl.
*B60Q 1/00* (2006.01)
*G08G 1/16* (2006.01)

(52) U.S. Cl.
CPC ............... *G08G 1/161* (2013.01); *G08G 1/166* (2013.01)

(58) Field of Classification Search
CPC ............ G01S 1/68; G01S 3/50; G08B 29/02; G08B 25/06; H04N 9/455; H04N 9/70; B82Y 30/00; G02B 6/2826; G02B 6/283; G02F 1/011; G02F 1/0118; G02F 1/065; H03L 7/10; H03L 7/02; H03L 7/04; H04B 1/716

USPC ......... 340/435, 988–990, 901–902, 436, 438, 340/431, 443, 426.16, 426.25, 426.23
See application file for complete search history.

(56) References Cited

U.S. PATENT DOCUMENTS

| | | | | |
|---|---|---|---|---|
| 4,627,634 | A * | 12/1986 | Coleman | 280/477 |
| 5,938,395 | A * | 8/1999 | Dumont, Jr. | 414/462 |
| 6,317,682 | B1 * | 11/2001 | Ogura et al. | 701/117 |
| 8,044,776 | B2 * | 10/2011 | Schofield et al. | 340/425.5 |
| 8,098,145 | B2 | 1/2012 | Ancuta et al. | |
| 2005/0046584 | A1 | 3/2005 | Breed | |
| 2012/0027548 | A1 * | 2/2012 | Whitfield et al. | 414/408 |
| 2012/0215381 | A1 | 8/2012 | Wang et al. | |
| 2013/0038436 | A1 * | 2/2013 | Brey et al. | 340/431 |
| 2014/0005887 | A1 * | 1/2014 | Tippelhofer | 701/37 |

FOREIGN PATENT DOCUMENTS

KR 20130114404 A 10/2013

* cited by examiner

*Primary Examiner* — Daniel Previl
(74) *Attorney, Agent, or Firm* — Frank A. MacKenzie; Brooks Kushman P.C.

(57) ABSTRACT

An exemplary system for a vehicle having an object attached to it may include a user interface device, a controller, and a communication system. The user interface device may be configured to receive and transmit information relating to the object. The controller may be in communication with the user interface device, and may be configured to receive the information from the user interface device. The communication system may be in communication with the controller, and may be configured to transmit at least a subset of the information to at least one other vehicle.

20 Claims, 2 Drawing Sheets

US 9,224,298 B2

SYSTEM AND METHOD FOR COMMUNICATING AN OBJECT ATTACHED TO A VEHICLE

BACKGROUND

Many vehicles implement a communication system, such as a vehicle-to-vehicle communication system, which may enable communication of different kinds of information from one vehicle to another. One such information may include the position of the vehicle. This may allow for vehicles to become more densely packed on any particular road, such as on a highway. However, such systems do not account for trailers or any other kinds of objects attached to the vehicle that may alter the collective size of the vehicle. In such situations, the second vehicle without the trailer may not be able to accurately determine the position of the first vehicle with the trailer, particularly when visibility is low, such as with heavy fog.

Therefore, there exists a need for a system and a method for accounting for an object attached to a vehicle, and to communicate that object to other vehicles.

SUMMARY

An exemplary system for a vehicle having an object attached to it may include a user interface device, a controller, and a communication system. The user interface device may be configured to receive and transmit information relating to the object. The controller may be in communication with the user interface device, and may be configured to receive the information from the user interface device. The communication system may be in communication with the controller, and may be configured to transmit at least a subset of the information to at least one other vehicle.

An exemplary vehicle may include an attachment mechanism, a user interface device, a controller, and a communication system. An object may be attached to the vehicle by the attachment mechanism. The user interface device may be configured to receive and transmit information relating to the object. The controller may be in communication with the user interface device, and may be configured to receive the information from the user interface device. The communication system may be in communication with the controller, and may be configured to transmit at least a subset of the information to at least one other vehicle.

An exemplary method may include first receiving, by a controller, information about an object attached to a first vehicle. The exemplary method may then include transmitting, by a communication system, at least a subset of the information to at least a second vehicle.

DETAILED DESCRIPTION

Figure 1:
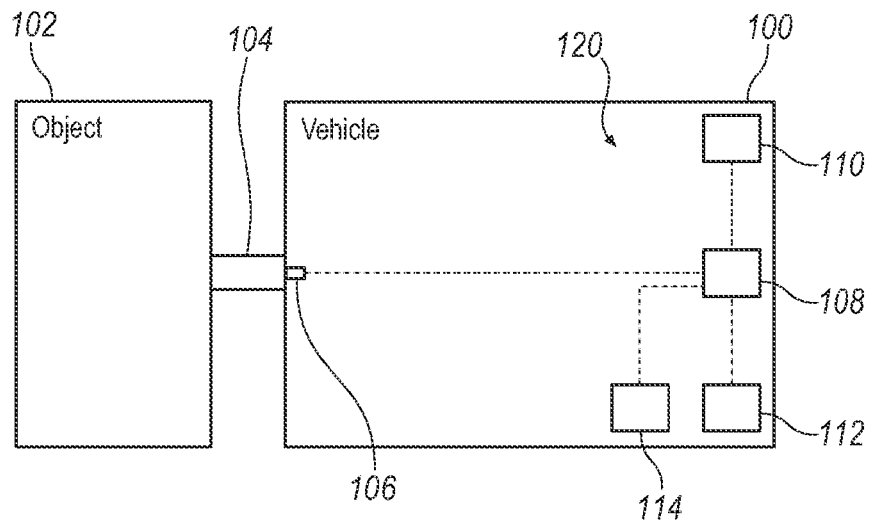
FIG. 1 is a block diagram illustrating an exemplary system for communicating an object attached to a vehicle to nearby vehicles.

FIG. 1 shows a vehicle 100 that has a system 120 configured to enable communication to other vehicles that an object 102 is attached to the vehicle 100. The object 102 may include, but is not limited to, a trailer, another vehicle, a bike, a boat, a wagon, and the like. The vehicle 100 generally has an attachment mechanism 104 that enables the object 102 to be attached to the vehicle 100. The attachment mechanism 104 may be, but is not limited to, a hitch, a rack, and the like. While the object 102 is shown in FIG. 1 as being attached to the rear of the vehicle 100 by the attachment mechanism 104, it should be appreciated that the object 102 may be attached to any side of the vehicle 100. As such, the attachment mechanism 104 may be located at any side or end of the vehicle 100, as well as below or above the vehicle 100.

The system 120 may include a detection device 106, a controller 108, a user interface device 110, and a communication system or device 112. The detection device 106 may be configured to detect that the object 102 is attached to the vehicle 100, and after detecting such, generating and transmitting a signal to the controller 108 that the object 102 is attached to the vehicle 100. The signal may be transmitted to the controller 108 electronically and/or wirelessly.

In one exemplary approach, the detection device 106 may be a sensor incorporated with the attachment mechanism 104 such that when the object 102 engages with the attachment mechanism 104, the signal may be generated. In another example, the detection device 106 may be a scale or similar device incorporated into the attachment mechanism 104 and/or the vehicle 100 such that when the scale measures a weight above a predetermined magnitude, the signal may be generated. In yet another exemplary approach, the detection device 106 may be a camera configured to capture an image or a series of images of the object 102, and to output a signal representing the image(s) to the controller 108. The controller 108 may then analyze the image(s) to determine that the object 102 is attached to the vehicle 100. The camera may be located anywhere on the vehicle 100 with a line of sight to the object 102, such as on a rear bumper of the vehicle 100. In yet another example, the detection device 106 may be a proximity sensor configured to detect when an object is within a certain proximity of the vehicle 100. The controller 108 may determine that the object 104 is attached or may alert a user of the system 120, such as the driver or another occupant of the vehicle 100, if, for example, the proximity sensor detects the object for longer than a predetermined time interval. It should be appreciated that the detection device 106 may be any device, mechanism, and/or system that may detect, sense, or otherwise recognize that the object 102 is attached to the vehicle 100, and to communicate such to the controller 108.

The controller 108 may be configured to receive and process the signal from the detection device 106, and then to prompt the user via the user interface device 110 to provide details and/or information about the object 102. The user interface device 110 may be any combination of an onboard computer, such as a navigation and/or entertainment system, an audio/visual system, and the like. The user interface device 110 may be configured to present information and/or data to the user, as well as to enable the user to provide information to the controller 108. The user interface device 110 may include a display screen configured to present text, images, etc., to the user. In some possible implementations, the user interface device 110 may include an input device configured to receive an input from the user. This may include a microphone configured to transmit verbal communication to the controller 108. In other possible approaches, the user interface device 110 may include a touchscreen display that acts as both the display device and the input device. That is, the touchscreen display may present text, images, selectable options, such as buttons, or the like, to the user, and receive an input from the user when the user touches the touchscreen display. The user interface device 110 may be configured to display requests for information from the user and receive the input from the user following the request. When prompted, the user may provide the requested information through the input device, or in the instance where the user interface device 110 includes a touchscreen display, by touching various portions of the user interface device 110.

The requested information may include, but is not limited to, the type of object 102, the size and/or dimensions of the object 102 (e.g., the height, the width, the length), and the like. The information also may be a confirmation that the object 102 is in fact attached to the vehicle 100. In one possible approach, the user may be provided on the user interface device 110 a series of fields in which the user may input the requested information. Alternatively or in addition, there may be a dropdown or selection menu appearing on the user interface device 110, such as on an onboard computer, from which the user may select typical or standard attachable objects. The desired information for each object may be stored in a memory device 114, and may be retrieved and populated when selected by the user from the dropdown or selection menu. The memory device 114 generally may be configured to electronically store data, applications, or both.

In another approach, the prompt for information may be delivered verbally to the user via the audio/visual system. The user may then provide the information verbally or via the onboard computer, after which the information may be stored in the memory 114 either permanently or temporarily.

Figure 2:
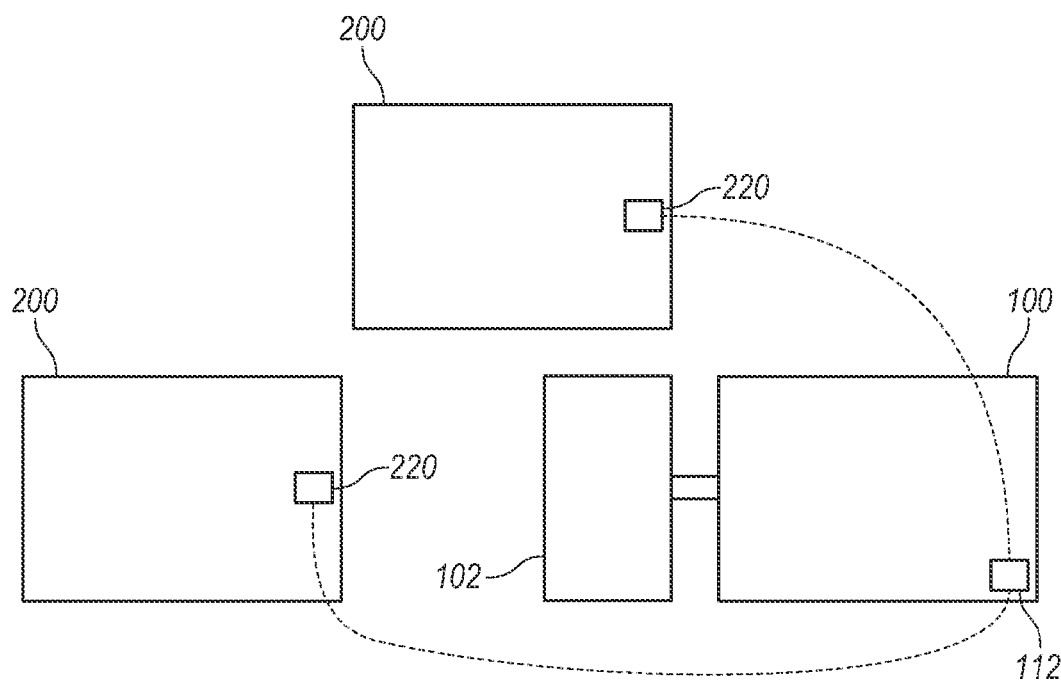
FIG. 2 is a block diagram illustrating an exemplary exchange of information between the vehicle of FIG. 1 and other vehicles.

The communication system 112 is configured to transmit the information received from the user and/or retrieved from the memory device 114 to at least one other vehicle 200, as seen in FIG. 2. In one exemplary approach, the communication system 112 may include, but is not limited to, a WiFi system, an embedded modem, and a dedicated short-range communication (DSRC) system by which the information, in the form of a wireless signal, may be sent wirelessly to the second vehicle 200 where it may be received and processed by a system 220 within the second vehicle 200. The system 220 may include any combination of at least a user interface device (not shown), a processor (not shown), a communication system (not shown), and a memory (not shown). The information may be sent directly to the second vehicle 200, as seen in FIG. 2. Alternatively, the information may be sent indirectly to the second vehicle 200 by first sending the information to an external device or system, such as a "cloud computing" device, a server, or a collection of servers, from which the system 220 may access the information.

In another example, the communication system 112 may include a light or series of lights that flash in a defined pattern to be received by the system 220 of the second vehicle 200. The system 220 may have an internal code for deciphering the pattern to obtain the information. Alternatively or in addition, the pattern may be viewed by a driver or other occupant of the second vehicle 200 to alert them of the object attached to the vehicle 100. It should be appreciated that the communication system 112 may include any mechanism, device, system, such as a vehicle-to-vehicle communication system, through which the information may be transmitted from the first vehicle 100 to the second vehicle 200.

Computing devices, such as the controller 108, the user interface device 110, and/or the communication system 112, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as the memory 114, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 3:
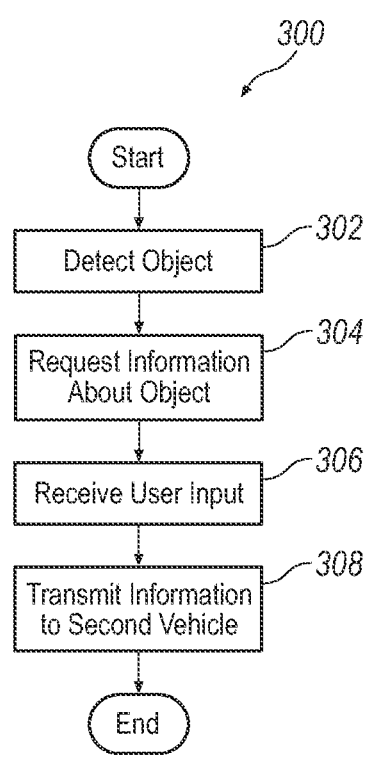
FIG. 3 is a flow diagram illustrating an exemplary method of implementing the system of FIG. 1.

Referring now to FIG. 3, an exemplary process 300 of communicating the information about the object 102 is shown. While the exemplary process 300 is described using system 120, it should be appreciated that any system capable of communicating the information may be implemented by process 300.

At block 302, the detection device 106 may detect the object 102. In the exemplary approaches in which the device 106 may be a sensor, as explained above, this may occur after the object 102 has triggered the sensor. In the approaches in which the detection device 106 may be a scale, block 302 may occur after the scale measures an added weight from the object 102 that exceeds a predetermined magnitude. In the approaches in which the detection device 106 is a proximity sensor, block 302 may occur after the proximity sensor senses the object 102 within a defined proximity of the vehicle 100 for longer than a predefined period of time. In the approaches in which the detection device 106 is a camera, block 302 may include taking a picture of the object 102 and transmitting a signal representing the image to the processor 108. As explained above, the detection device 106 may be any mechanism, device, and/or system capable of detecting the object 102.

After block 302, exemplary process 300 proceeds to block 304 in which the processor 108 prompts the user of the system 120 via the user interface device 110 for specific information about the object 102. As explained above, the information may be a confirmation that the object 102 is in fact attached to the vehicle 100, what the object 102 may be, the dimensions of the object 102 (e.g., height, width, length, etc.), and the like. The prompt may appear visually on an onboard computer, or audibly via an audio/visual system.

After block 304, exemplary process 300 proceeds to block 306 in which the processor 104 receives a user input via the user interface device 110, where the user input is the information requested in block 302. The user input may be provided via an onboard computer where the user makes selections or types in the specific information in provided fields, or verbally in which the vehicle 100 incorporates a microphone in the audio/visual system. It should be appreciated that block 306 may be performed without blocks 302 or 304, where the user inputs the information on his own accord.

After block 306, exemplary process 300 proceeds to block 308 in which the communication system transmits at least a subset of the information to at least one other vehicle 300. Process 300 ends after block 308.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, the use of the words "first," "second," etc. may be interchangeable.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system, comprising:
   a sensor at an attachment mechanism configured to detect a towable object attached thereto at a first vehicle;
   an interface configured to receive user input indicating a size of the towable object in response to the sensor recognizing the towable object;
   a controller in communication with the interface and configured to transmit the size of the towable object to a second vehicle in order for the second vehicle to realize a collective size of the first vehicle and the towable object.

2. The system of claim 1 wherein the sensor includes a scale, and is configured to generate and transmit a signal to the controller to detect the towable object at the attachment mechanism when the scale measures a weight that exceeds a predetermined magnitude.

3. The system of claim 1 wherein the sensor includes a proximity sensor configured to detect the towable object when the towable object is within a pre-defined proximity to the vehicle, and to generate and transmit a signal to the controller when the sensor it continually detects the towable object for a predetermined time interval.

4. The system of claim 1 wherein the sensor includes an onboard camera configured to take at least one image to detect the towable object.

5. The system of claim 1 wherein the controller is further configured to prompt the user interface device for the information about the towable object.

6. The system of claim 1 wherein the size includes at least one of a height, a width, and a length of the towable object.

7. A vehicle comprising:
   an attachment mechanism configured to receive an object;
   an interface configured to receive user input;
   a controller configured to:
      receive an indication of the object at the attachment mechanism;
      present an alert via the interface;
      receive object size information via the interface; and
      transmit the information to at least one other vehicle in order for the other vehicle to realize a placement of the object.

8. The vehicle of claim 7 further comprising a detection device configured to detect the object attached to the attachment mechanism, and to generate and transmit a signal to the controller indicating that the object is attached to the attachment mechanism.

9. The vehicle of claim 8 wherein the detection device includes a scale, and is configured to generate and transmit the signal to the controller indicating presence of the object at the attachment mechanism when the scale measures a weight that exceeds a predetermined magnitude.

10. The vehicle of claim 8 wherein the detection device includes a proximity sensor configured to sense detect the object when the object is within a pre-defined proximity to the vehicle, and to generate and transmit the signal to the controller when the proximity sensor continually detects the object for a predetermined time interval.

11. The vehicle of claim 8 wherein the detection device includes an onboard camera configured to take at least one image to detect the object, and wherein the signal includes the at least one image.

12. The vehicle of claim 7 wherein the alert includes a prompt for the information about the object.

13. The vehicle of claim 12 wherein the prompt includes selectable options including selectable types of attachable objects.

14. The vehicle of claim 13 wherein the prompt includes at least one fillable field, dropdown menu, and selection menu.

15. The vehicle of claim 7 wherein the object size information includes at least one of a height, a width, and a length of the object.

16. A method comprising:
receiving, from a sensor, an indication of a towable object at a first vehicle;
receiving, via an interface, object size information for the towable object; and
transmitting, via a communication system, the object size information to a second vehicle in order for the second vehicle to realize a collective size of the first vehicle and the towable object.

17. The method of claim 16 further comprising requesting, at the interface, the object size information in response to receiving the indication of the towable object at the first vehicle.

18. The method of claim 16 wherein the object size information includes at least one of a height, a width, and a length of the towable object.

19. The method of claim 16 further comprising storing at least a subset of the object size information in at least one memory device.

20. The method of claim 15 wherein the communication system is a vehicle-to-vehicle communication system.

* * * * *